(12) United States Patent
Nakayama et al.

(10) Patent No.: US 8,023,386 B2
(45) Date of Patent: *Sep. 20, 2011

(54) OPTICAL PICKUP APPARATUS AND OPTICAL DISK DRIVE APPARATUS

(75) Inventors: Masahiko Nakayama, Kanagawa (JP); Hiroshi Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 12/071,480

(22) Filed: Feb. 21, 2008

(65) Prior Publication Data

US 2008/0165657 A1 Jul. 10, 2008

Related U.S. Application Data

(63) Continuation of application No. 10/765,503, filed on Jan. 28, 2004, now Pat. No. 7,359,295.

(30) Foreign Application Priority Data

| Jan. 29, 2003 | (JP) | 2003-020440 |
| Feb. 10, 2003 | (JP) | 2003-032198 |
| Feb. 10, 2003 | (JP) | 2003-032204 |
| Feb. 19, 2003 | (JP) | 2003-040898 |

(51) Int. Cl.
*G11B 7/00* (2006.01)

(52) U.S. Cl. ............ 369/112.01; 369/112.1; 369/112.15

(58) Field of Classification Search .......... 369/112, 369/112.01, 112.15, 112.1
See application file for complete search history.

(56) References Cited

U.S. PATENT DOCUMENTS

| 4,733,065 A | 3/1988 | Hoshi et al. |
| 5,428,595 A | 6/1995 | Yoshida et al. |
| 5,428,597 A | 6/1995 | Satoh et al. |
| 5,708,638 A | 1/1998 | Braat et al. |
| 5,917,800 A | 6/1999 | Choi |
| 6,091,690 A * | 7/2000 | Sano et al. ............. 369/44.23 |
| 6,208,596 B1 | 3/2001 | Imai et al. |
| 6,212,150 B1 | 4/2001 | Inoue et al. |
| 6,339,562 B1 | 1/2002 | Sakai |
| 6,407,973 B1 | 6/2002 | Ophey |
| 6,757,224 B2 | 6/2004 | Fukakusa et al. |
| 6,850,472 B2 * | 2/2005 | Miyazaki et al. ......... 369/53.23 |

(Continued)

FOREIGN PATENT DOCUMENTS

EP    0 401 764 A2    12/1990

(Continued)

OTHER PUBLICATIONS

Japanese Office Action dated Jul. 15, 2008.

*Primary Examiner* — Wayne Young
*Assistant Examiner* — Linh Nguyen
(74) *Attorney, Agent, or Firm* — Dickstein Shapiro LLP

(57) ABSTRACT

An optical pickup apparatus for reproducing information from an optical disk, includes: a semiconductor laser applying a beam to an optical disk having two recording layers through an objective lens; and a light receiving device to which light reflected from the optical disk is directed through the objective lens and a beam splitting device, wherein: the beam splitting device has two first light receiving areas for detecting a push-pull signal and a second light receiving area for detecting a focus error signal, and a configuration is provided such that the center of the optical axis of the reflected light in the beam splitting device is made to lie within the second light receiving area for detecting the focus error signal.

7 Claims, 16 Drawing Sheets

U.S. PATENT DOCUMENTS

| | | |
|---|---|---|
| 7,019,280 B2 | 3/2006 | Kukubo et al. |
| 7,227,819 B2 | 6/2007 | Kadowaki et al. |
| 7,359,295 B2 * | 4/2008 | Nakayama et al. ........ 369/44.37 |
| 7,649,825 B2 * | 1/2010 | Tsuchida et al. ......... 369/112.07 |
| 2001/0050892 A1 | 12/2001 | Takahashi et al. |
| 2002/0018406 A1 | 2/2002 | Yamada |
| 2002/0027862 A1 | 3/2002 | Yoo et al. |
| 2002/0057359 A1 * | 5/2002 | Tadano et al. ................. 348/335 |
| 2003/0090968 A1 | 5/2003 | Miyake |
| 2004/0008606 A1 | 1/2004 | Saitoh et al. |
| 2004/0027939 A1 | 2/2004 | Okada |
| 2005/0141391 A1 * | 6/2005 | Ueyama et al. ............. 369/112.1 |
| 2006/0164951 A1 * | 7/2006 | Yamasaki et al. ........ 369/112.01 |

FOREIGN PATENT DOCUMENTS

| | | |
|---|---|---|
| EP | 0 984 440 A | 3/2000 |
| EP | 1 172 808 A2 | 1/2002 |
| JP | 61-11947 | 1/1986 |
| JP | 61-237245 | 10/1986 |
| JP | 4-3013 | 1/1992 |
| JP | 05-120726 | 5/1993 |
| JP | 5-205295 | 8/1993 |
| JP | 08-036778 | 2/1996 |
| JP | 2594445 | 12/1996 |
| JP | 11-353698 | 12/1999 |
| JP | 2002-251753 | 9/2002 |

* cited by examiner

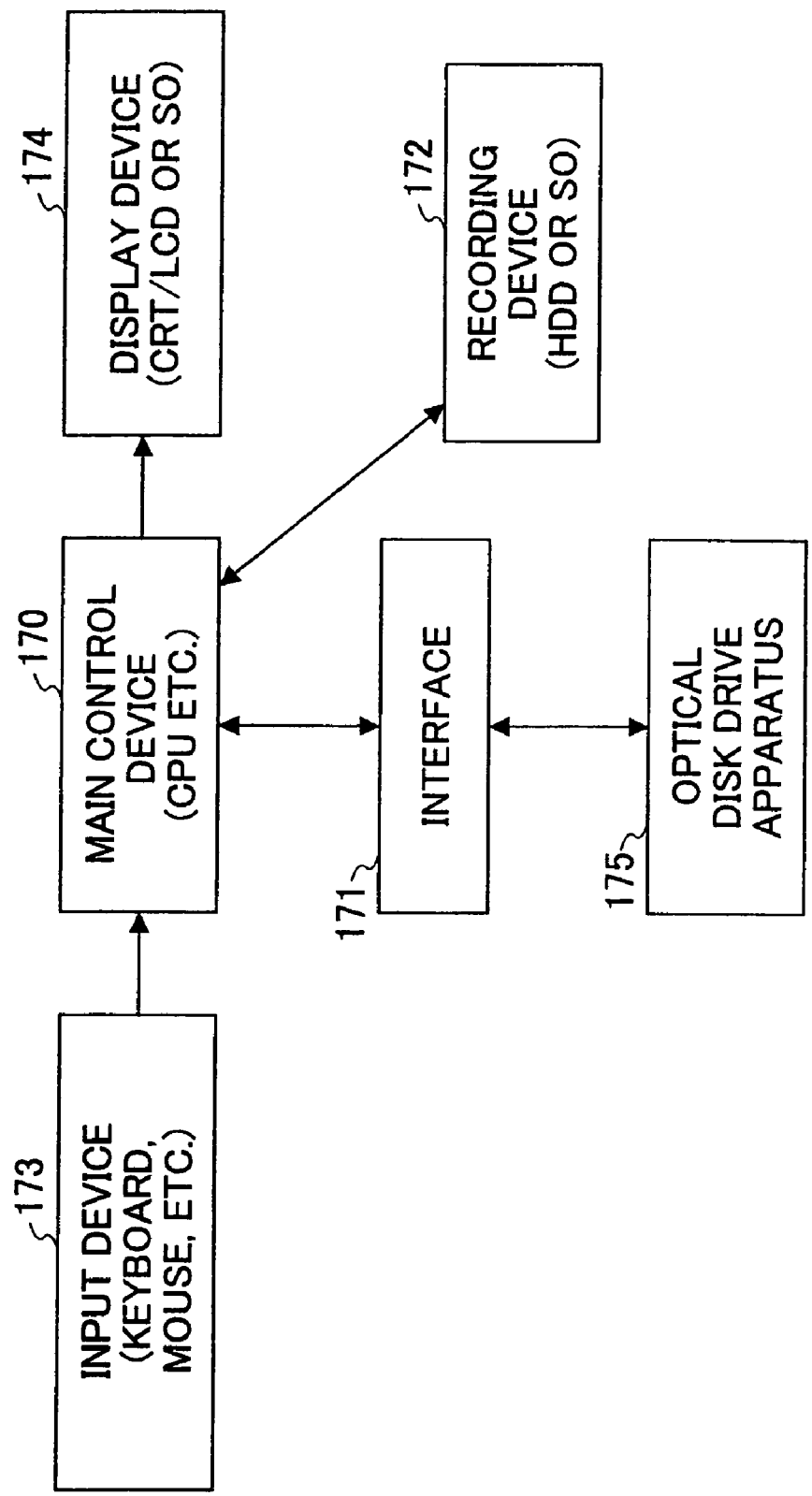

OPTICAL PICKUP APPARATUS AND OPTICAL DISK DRIVE APPARATUS

CROSS REFERENCE TO RELATED APPLICATIONS

This Application is a continuation application of U.S. patent application Ser. No. 10/765,503, filed Jan. 28, 2004, now U.S. Pat. No. 7,359,295 and claims the priority therefrom, and of which the complete disclosure is incorporated herein by reference.

BACKGROUND OF THE INVENTION

1. Field of the Invention

The present invention relates to an optical pickup apparatus and an optical disk drive apparatus such as an optical card apparatus or so.

2. Description of the Related Art

FIG. 1 shows a general configuration of an optical pickup apparatus provided in an optical disk drive apparatus. As shown, the optical pickup apparatus handles an optical disk 8 and includes a semiconductor laser 1, a glass plate 2, a grating 3 formed on a side of the glass plate, which side faces the semiconductor laser 1, for generating three beams, a hologram 4 formed on a side of the glass plate, which side is opposite to the side on which the grating 3 is formed, a hologram pickup 5, a collimator lens 6, an objective lens 7, and a light receiving device 9.

FIG. 2 shows an internal side view of the hologram pickup 5. As shown, the hologram pickup 5 includes the semiconductor laser 1 and the light receiving device 9 mounted on a substrate, and also, the glass plate 2, grating 3 and hologram 4 arranged to face the semiconductor laser 1, and thus, these parts/devices form a unit.

A beam emitted from the semiconductor laser 1 is split into a main beam (0-th light) and two sub-beams (±1-st lights) by means of the grating 3 functioning as a diffraction grating for the three beams, and after that, reaches the hologram 4. Then, only a light (0-th light) transmitted by the hologram 4 is made to become a parallel beam by means of the collimator lens 6, and is collected onto the optical disk 8 after passing through the objective lens 7. Returning lights of the main beam and sub-beams reflected by the optical disk 8 are directed to the hologram 4 after again passing through the objective lens 7 and collimator lens 6. Then, at this time, only a light (1-st diffracted light) diffracted by the hologram 4 is applied to the light receiving device 9, and is used for generating various signals which will be described later.

The optical disk 8 includes two recording layers 8a and 8b with a separation of tens of μm (on the order of a range between 40 and 70 μm), and FIG. 1 shows a case where the beam applied is made to focus in the recording layer 8a nearer to the objective lens 7. Reflected light 10 indicated by a solid line in FIG. 1 is a beam which has been reflected by the recording layer 8a nearer to the objective lens 7, while reflected light 11 indicated by a broken line is a beam which was reflected by the recording layer 8b farther from the objective lens 7.

FIG. 3 illustrates a state of the reflected light 10 from the recording layer 8a and the reflected light 11 from the recording layer 8b in the hologram 4. As shown, the hologram 4 is separated into three areas AB, C and D defined by two separating lines.

FIG. 4 illustrates a state of the reflected light 10 from the recording layer 8a and the reflected light 11 from the recording layer 8b on the light receiving device 9. The total three beams, i.e., the main beam and two sub-beams provided by the grating 3 are split by the hologram 4. As a result, the reflected light 10 from the recording layer 8a forms nine spots while the reflected light 11 from the recording layer 8b forms nine flare without focusing.

As shown in FIG. 4, the light receiving device 9 includes eight light receiving surfaces 'a' through 'h', and relationship between beams obtained from the diffraction by the above-mentioned three areas AB, C and D of the hologram 4 and the light receiving surfaces receiving these beams respectively is as follows:

the diffracted light of the main beam from the area AB is received between the light receiving surfaces 'a' and 'b';

the diffracted lights of the sub-beams from the area AB are received outside of the light receiving surfaces 'a' and 'b', respectively (in other words, these are not substantially received by any of the light receiving surfaces);

the diffracted light of the main beam from the area C is received by the light receiving surface 'c';

the diffracted lights of the sub-beams from the area C are received by the light receiving surfaces 'e' and 'g', respectively;

the diffracted light of the main beam from the area D is received by the light receiving surface 'd'; and the diffracted lights of the sub-beams from the area D are received by the light receiving surfaces 'f' and 'h' respectively.

By expressing the various signals obtained from the respective light receiving surfaces 'a' through 'h' by the respective same symbols 'a' through 'h', a focus error signal FES is expressed by:

$$FES=a-b.$$

A tracking error signal TES is expressed by:

$$TES=(c-d)-\alpha((e+g)-(f+h)).$$

A tracking cross signal TCS is expressed by:

$$TCS=(c+d)-\alpha((e+g)+(f+h)).$$

A lens position signal LPS is expressed by:

$$LPS=(c-d)+\alpha((e+g)-(f+h))$$

An information reproducing signal RFS is expressed by:

$$RFS=a+b+c+d.$$

These relationships are obtained according to a so-called differential push-pull method well known.

Japanese patent No. 2594445 (registered in Dec. 19, 1996 and entitled 'Hologram Optical Head', the inventors: Shuichi Onayama et al.) and Japanese laid-open patent application No. H11-353698 (published in Dec. 24, 1999, entitled 'Optical Pickup Apparatus', the inventor: Masahiko Nakayama) disclose the background arts. Specifically, Japanese patent No. 2594445 discloses a hologram for a hologram optical head having a circular area at the center for making easier spot adjustment for returning light (see FIG. 1 of this patent). Japanese laid-open patent application No. H11-353698 discloses an optical pickup apparatus diffracting reflected light from an optical disk by means of a hologram so as to direct it toward a light receiving device (see FIG. 1 of this laid-open patent application)

FIG. 5 shows a general configuration of another optical pickup apparatus in an optical disk drive apparatus. As shown, the optical pickup apparatus handles an optical disk 108 and includes a semiconductor laser 101, a glass plate 102, a grating 103 formed on a side of the glass plate, which side faces the semiconductor laser 101, for generating three beams, a hologram 104 formed on a side of the glass plate, which side is opposite to the side on which the grating 103 is formed, a hologram pickup 105, a collimator lens 106, an objective lens 107, and a light receiving device 109.

FIG. 6 shows an internal side view of the hologram pickup 105. As shown, the hologram pickup 105 includes the semiconductor laser 101 and the light receiving device 109 mounted on a substrate, and also, the glass plate 102, grating 103 and hologram 104 arranged to face the semiconductor laser 101, and thus, these parts/devices form a unit.

A beam emitted from the semiconductor laser 101 is split into a main beam (0-th light) and two sub-beams (±1-st lights) by means of the grating 103 functioning as a diffraction grating for the three beams, and after that, reaches the hologram 104. Then, only a light (0-th light) transmitted by the hologram 104 is made to become a parallel beam by means of the collimator lens 106, and is collected onto the optical disk 108 after passing through the objective lens 107. Returning lights of the main beam and sub-beams reflected by the optical disk 108 are directed to the hologram 104 after again passing through the objective lens 107 and collimator lens 106. Then, at this time, only a light (1-st diffracted light) diffracted by the hologram 104 is applied to the light receiving device 109, and is used for generating various signals.

FIG. 7 illustrates a state of the reflected light 110 from the optical disk 108, on the hologram 104. As shown, the hologram 104 is separated into three areas AB, C and D by two separating lines. In FIG. 7, zones hatched denote zones at which a push-pull component occurs. Details of the push-pull signal are disclosed by Japanese patent publication No. H04-3013 (published on Jan. 21, 1992, entitled 'Optical Track Position Detection Apparatus and Optical Recording/reproduction Apparatus applying it', inventors: Shigeru Nakamura et al.)

Specifically, Japanese patent publication No. H04-3013 discloses an optical detector for detecting tracking error provided in a form symmetrical with respect to the track direction and disposed in a region within an interference region of 0-th diffracted light and ±1 diffracted light and further narrowed for the amount of maximum moving range of optical axis error of the reflected light caused in a tracking process or by disk inclination (see FIG. 9 of this publication).

FIG. 8 illustrates a state of the reflected light 110 from the optical disk 108, on the light receiving device 109. As shown, the light receiving device 109 includes eight light receiving surfaces 'a' through 'h', and relationship between beams obtained from the diffraction by the above-mentioned three areas AB, C and D of the hologram 4 and the light receiving surfaces receiving these beams respectively is as follows:

the diffracted light of the main beam from the area AB is received between the light receiving surfaces 'a' and 'b';

the diffracted lights of the sub-beams from the area AB are received outside of the light receiving surfaces 'a' and 'b', respectively (in other words, are not substantially received by any light receiving surfaces);

the diffracted light of the main beam from the area C is received by the light receiving surface 'c';

the diffracted lights of the sub-beams from the area C are received by the light receiving surfaces 'e' and 'g', respectively;

the diffracted light of the main beam from the area D is received by the light receiving surface 'd'; and the diffracted lights of the sub-beams from the area D are received by the light receiving surfaces 'f' and 'h' respectively.

By expressing the various signals obtained from the respective light receiving surfaces 'a' through 'h' by the same symbols 'a' through 'h' respectively, a focus error signal FES is expressed by:

$$FES=a-b.$$

A tracking error signal TES is expressed by:

$$TES=(c-d)-\alpha((e+g)-(f+h)).$$

A tracking cross signal TCS is expressed by:

$$TCS=(c+d)-\alpha((e+g)+(f+h))$$

A lens position signal LPS is expressed by:

$$LPS=(c-d)+\alpha((e+g)-(f+h))$$

An information reproducing signal RFS is expressed by:

$$RFS=a+b+c+d.$$

In the push-pull signal (PPS) obtained from the hatched zones shown in FIG. 7, the rate at which this signal is included in the areas C and D is 50% of the whole signal amount as shown. This signal amount is sufficient in case where information such as addresses or so is detected from a pre-groove of a CD-R/RW.

Other than the above-mentioned Japanese laid-open patent publication No. H04-3013, Japanese laid-open patent application No. H11-353698 (mentioned above) also discloses the background art.

SUMMARY OF THE INVENTION

In FIG. 4, on the respective light receiving surfaces of the light receiving device 9, not only the reflected lights from the recording layer 8a, but also reflected lights from the recording layer 8b are applied unevenly. Thereby, the above-mentioned signals FES, TES, TCS, LPS and RFS may not be detected properly.

In order to solve this problem, the present invention has an object to provide an optical pickup apparatus and an optical disk apparatus by which, especially in case where the beam focuses in the recording layer nearer to the objective lens, an adverse influence applied to the various signals caused by the reflected light 11 coming from the recording layer farther from the objective lens, in other words, the flares, can be effectively reduced, and thus, the various signals can be obtained properly.

An optical pickup apparatus according to the present invention for reproducing information from an optical disk includes: a semiconductor laser applying a beam to an optical disk having two recording layers through an objective lens; and a light receiving device to which light reflected from the optical disk is directed through the objective lens and a beam splitting device, wherein: the beam splitting device has two first light receiving areas for detecting a push-pull signal and a second light receiving area for detecting a focus error signal, and a configuration is provided such that the center of the optical axis of the reflected light in the beam splitting device is made to lie within the second light receiving area for detecting the focus error signal.

Thereby, it is possible to effectively reduce the adverse influence exerted upon various signal such as a focus error signal (FES), a tracking error signal (TES), a tracking cross signal (TCS), a lens position signal (LPS) and an information reproducing signal (RFS), caused by the reflected light, i.e., flare from the recording layer farther from the objective lens when focus occurs in the recording layer nearer to the objective lens.

It is preferable in the above-mentioned configuration of the optical pickup apparatus that lines defining the three light receiving areas comprise three straight lines and a curved line. Thereby, it is possible to increase the signal amounts of the components of the tracking error signal (TES) and tracking cross signal (TCS) and also, to improve the signal quality in the tracking error signal (TES), tracking cross signal (TCS) and lens position signal (LPS).

It is preferable in the above-mentioned configuration of the optical pickup apparatus that lines defining the three light receiving areas comprise three straight lines, and each of at least two angles formed between respective ones of these lines is more than 90 degrees. Thereby, it is possible to increase the signal amounts of the components of the tracking error signal (TES) and tracking cross signal (TCS) and also, to improve the signal quality in the tracking error signal (TES), tracking cross signal (TCS) and lens position signal (LPS).

It is preferable in any of the above-mentioned configurations of the optical pickup apparatus that, when the beam from the objective lens is made to focus in the recording layer nearer to the objective lens from among the two recording layers of the optical disk, the reflected light from the recording layer farther from the objective lens from among the two recording layers is applied to the second light receiving area for detecting the focus error signal.

Thereby, it is possible to completely eliminate the adverse influence exerted upon the various signal such as the focus error signal (FES), tracking error signal (TES), tracking cross signal (TCS), lens position signal (LPS), information reproducing signal (RFS), caused by the reflected light, i.e., flare from the recording layer farther from the objective lens when focus occurs in the recording layer nearer to the objective lens.

According to another aspect of the present invention, an optical pickup apparatus for reproducing information from an optical disk includes: a semiconductor laser applying a beam to an optical disk having two recording layers through an objective lens; and a light receiving device to which light reflected from the optical disk is directed through the objective lens and a beam splitting device, wherein: the beam splitting device has two first light receiving areas for detecting a push-pull signal, a second light receiving area for detecting a focus error signal and a fourth light receiving area including the optical axis of the reflected light.

Thereby, it is possible to completely eliminate the adverse influence exerted upon the various signal such as the focus error signal (FES), tracking error signal (TES), tracking cross signal (TCS), lens position signal (LPS), information reproducing signal (RFS), caused by the reflected light, i.e., flare from the recording layer farther from the objective lens when focus occurs in the recording layer nearer to the objective lens.

It is preferable in the above-mentioned configurations of the optical pickup apparatus that the beam splitting device comprises a hologram device. Thereby, it is possible to provide an inexpensive optical pickup apparatus.

It is preferable to employ any of the above-mentioned configurations of the optical pickup apparatus in an optical disk drive apparatus. Thereby, it is possible to provide an optical disk drive apparatus having an improved reliability in particular in terms of signal reproduction performance.

Recently, a DVD+RV/+R has spread widely which is a recording medium derived from the above-mentioned CD-R/RW but has a larger storage capacity. A pre-groove in the DVD+RW/+R wobbles as being modulated at higher speed than that in the CD-R/RW, and, as in the case of CD-R/RW, information such as addresses or so is read out from the pre-groove with a use of the above-mentioned push-pull signal. While the groove pitch is 1.6 µm in the CD-R/RW, the groove pitch is as small as 0.74 µm in the DVD+RW/+R. As a result, the amount of the push-pull signal obtained therefrom is very small in the case of DVD+RW/+R. As the modulation is made at high speed as mentioned above and also the signal amount itself is small as mentioned above, it is difficult to properly read out the information such as addresses or so from the pre-groove in case of the DVD+RW/+R with the same method as that provided for CD-R/RW.

Accordingly, another object of the present invention is to solve this problem, and to provide an optical pickup apparatus and an optical disk drive apparatus by which, especially, the information such as addresses or so written in the pre-grove of the DVD+RW/+R can be properly detected.

According to another aspect of the present invention, an optical pickup apparatus for reproducing information from an optical disk includes: a semiconductor laser applying a beam to an optical disk having two recording layers through an objective lens; and a light receiving device to which light reflected from the optical disk is directed through the objective lens and a beam splitting device, wherein: the beam splitting device has two first light receiving areas for detecting a push-pull signal and a second light receiving area for detecting a focus error signal, and the amount of the push-pull signal detected in the two first light receiving areas for detecting the push-pull signal is more than 50% of the total amount of the push-pull signal obtained from the optical disk. Thereby, it is possible to properly detect the information such as addresses or so written in the pre-groove of the DVD+RW/+R.

It is preferable in the above-mentioned configuration of the optical pickup apparatus that lines defining the three light receiving areas comprise three straight lines and a curved line. Thereby, it is possible to utilize a conventionally used circuit for signal detection for detecting the information such as addressees written in the pre-groove of the DVD+RW/+R, for example.

It is preferable in the above-mentioned configuration of the optical pickup apparatus that lines defining the three light receiving areas comprise three straight lines, and each of at least two angles formed between respective ones of these lines is more than 90 degrees. Thereby, it is possible to simplify the configuration of the beam splitting device, and thus, it is possible to employ an optical part such as a prism or so for example other than a hologram as the beam splitting device.

It is preferable in any of the above-mentioned configurations of the optical pickup apparatus that the beam splitting device is a hologram device. Thereby, it is possible to provide an inexpensive optical pickup apparatus.

It is preferable to employ any of the above-mentioned configurations of the optical pickup apparatus in an optical disk drive apparatus. Thereby, it is possible to provide an optical disk drive apparatus having an improved reliability in particular in terms of signal reproduction performance.

BRIEF DESCRIPTION OF THE DRAWINGS

Other objects and further features of the present invention will become more apparent from the following detailed description when read in conjunction with the following accompanying drawings:

FIG. 23 shows a general block diagram of an information processing apparatus employing the optical disk drive apparatus shown in FIG. 22.

DETAILED DESCRIPTION OF THE PREFERRED EMBODIMENTS

Embodiments of the present invention will now be described with reference to figures.

Each of first through fourth embodiments of the present invention which will now be described has a configuration same as the optical pickup apparatus described above with reference to FIGS. 1 through 4 except the hologram 4, and a fifth embodiment of the present invention has a configuration same as the optical pickup apparatus described above with reference to FIGS. 1 through 4 except the hologram 4 and the light receiving device 9, as will be described.

Figure 9:
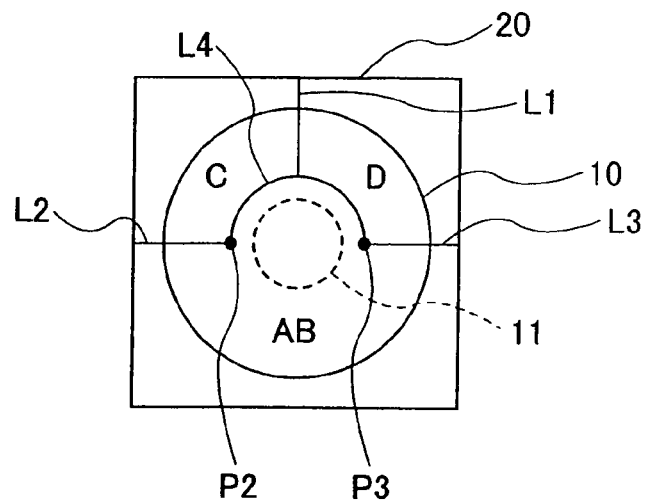
FIG. 9 shows a configuration of a hologram provided in an optical pickup apparatus according to a first embodiment of the present invention.

FIG. 9 illustrates a hologram 20 provided in an optical pickup apparatus in a first embodiment of the present invention, which hologram acts as a beam splitting device.

Figure 1:
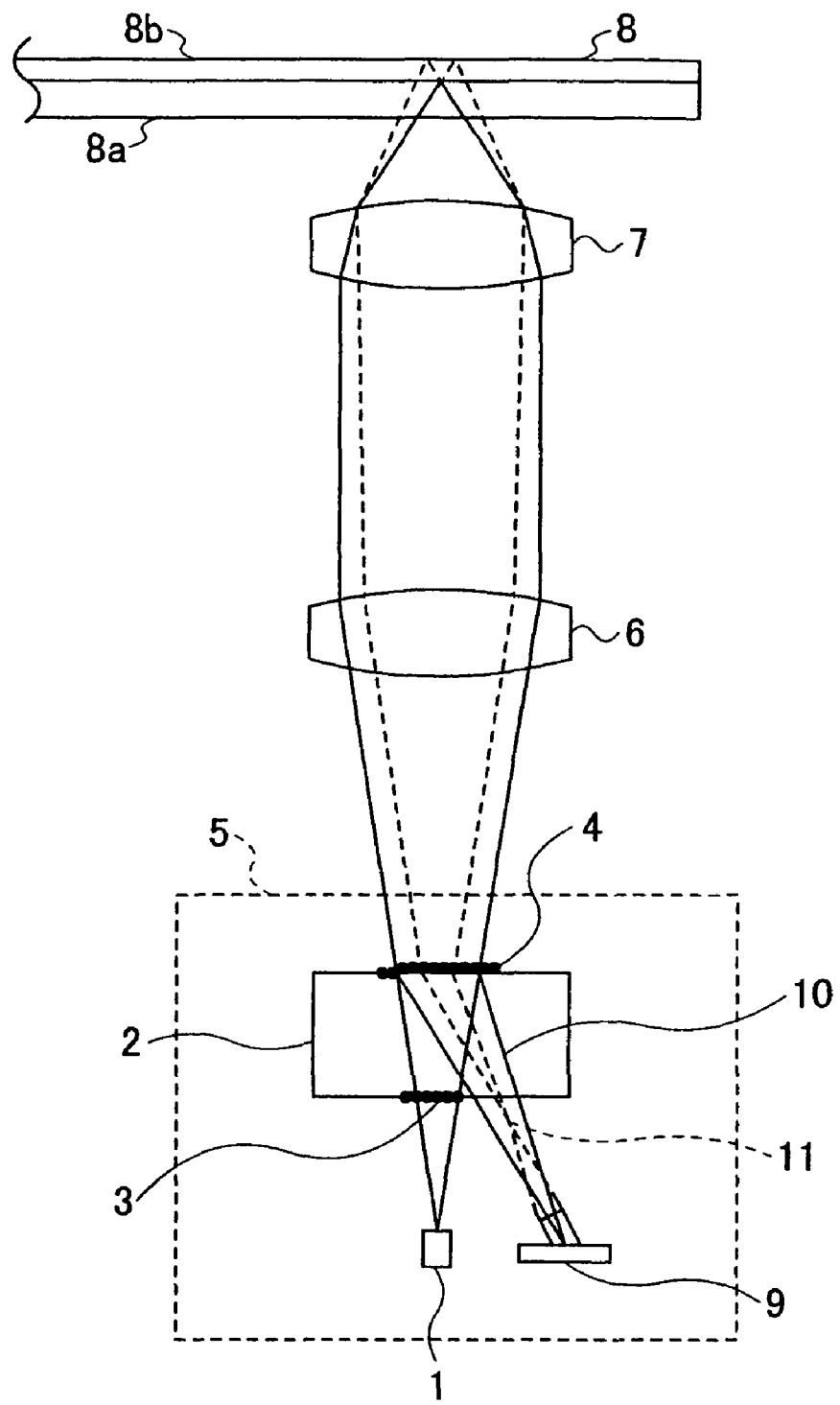
FIG. 1 illustrates a general configuration of an optical system of an optical pickup apparatus of an optical disk drive apparatus.
Figure 2:
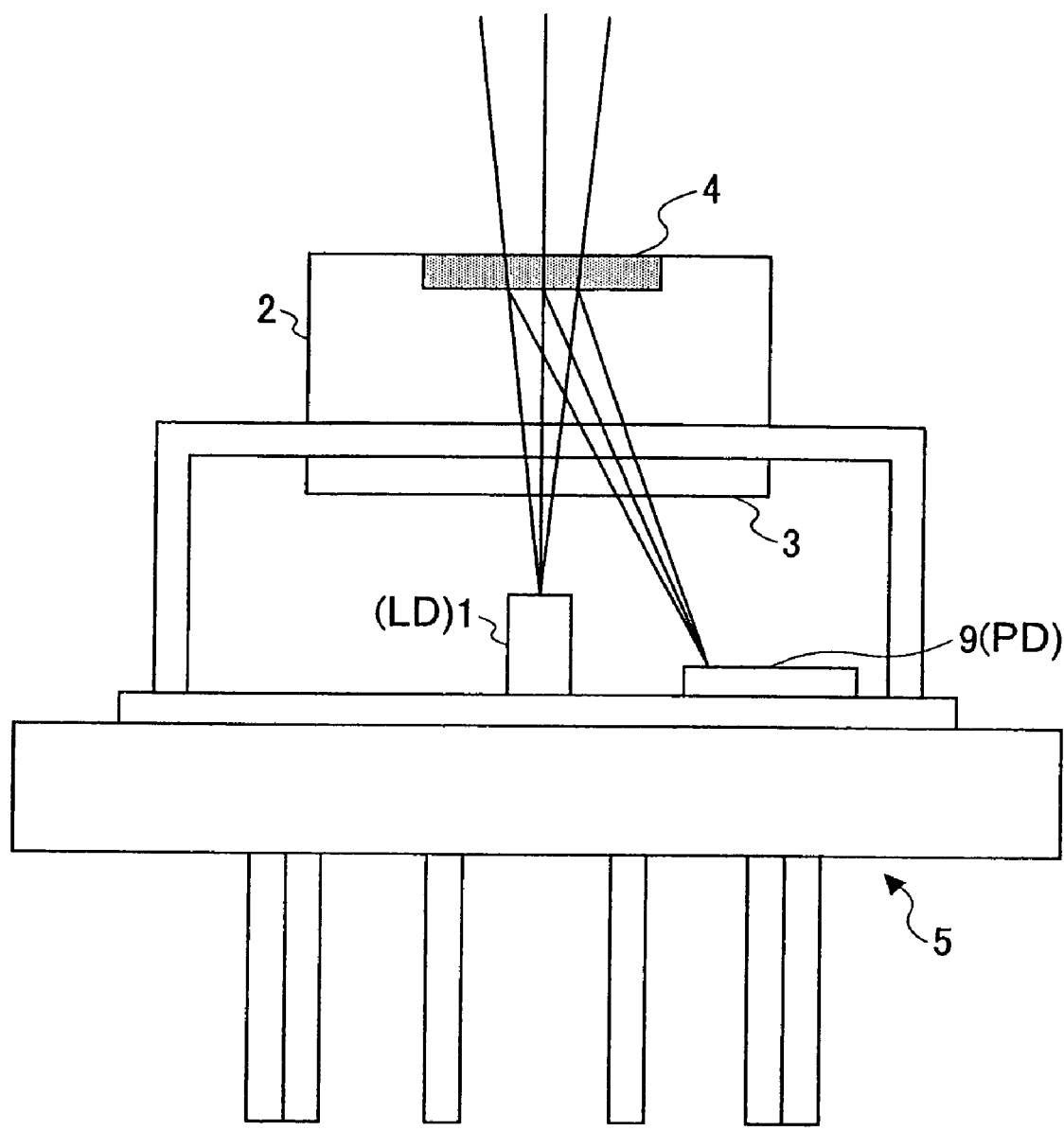
FIG. 2 shows an internal side view of a hologram pickup shown in FIG. 1.
Figure 3:
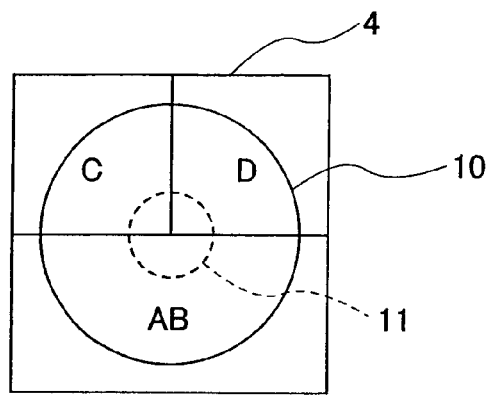
FIG. 3 illustrates a state of reflected light from a recording layer of an optical disk nearer to an objective lens and reflected light from a recording layer farther from the objective lens in a hologram shown in FIG. 2.
Figure 4:
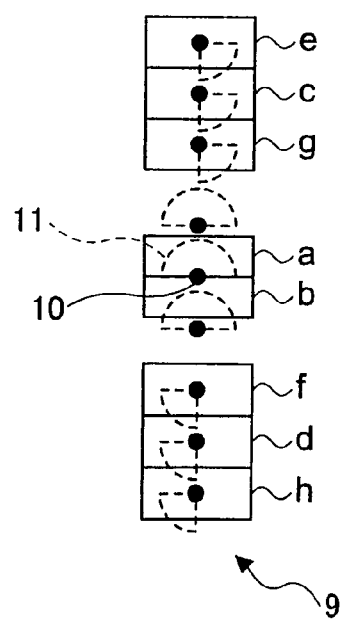
FIG. 4 illustrates a state of the reflected light diffracted by the hologram shown in FIG. 4 in a light receiving device shown in FIG. 2.

In the first embodiment, instead of the hologram 4 provided in the above-described optical pickup apparatus shown in FIG. 1, the hologram 20 is formed on the glass plate 2.

The hologram 20 includes total three areas, i.e., two areas C and D for detecting a push-pull signal and an area AB for detecting a focus error signal, and these areas are formed by separating lines, i.e., three straight lines L1, L2 and L3, and a curved line L4 Specifically, with respect to the center of the above-mentioned reflected light 10 coming from the above-mentioned recording layer 8a, the approximately semicircular line L4 and the two lines L2 and L3 extending from both ends P2 and P3 of the curved line L4 divides the hologram 20 into two areas. One of the thus-obtained two areas including the center of the reflected light 10 is the above-mentioned area AB. The remaining area is further divided into the two areas by the straight line L1 into two areas which are the above-mentioned areas C and D.

The radius of the above-mentioned approximately semicircular curved line L4 should be determined to be larger than the radius of the spot formed by the above-mentioned reflected light 11 from the above-mentioned recording layer 8b on the hologram 20 when the reflected light 11 is applied to the hologram 20. As a result, as the diameter of the spot formed by the reflected light 10 from the recording layer 8a nearer to the objective lens 7 when the reflected light 10 is applied to the hologram 20 is larger than the diameter of the spot formed by the reflected light 11 from the recording layer 8b when the reflected light 11 is applied to the hologram 20, the reflected light 10 from the recording layer 8a is applied to the areas AB and areas C and D while the reflected light 11 from the recording layer 8b is applied to the area AB, as shown in FIG. 9.

Figure 10:
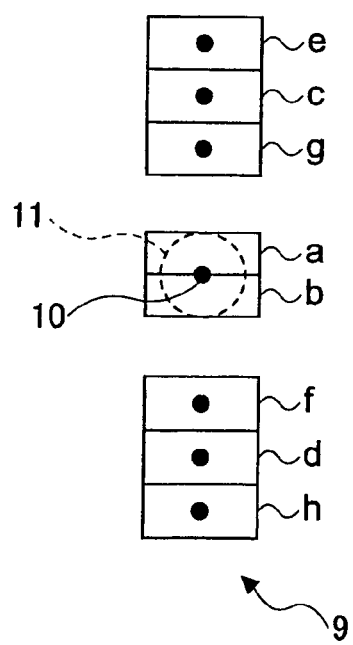
FIG. 10 shows a state of reflected light from a recording layer of an optical disk nearer to an objective lens and reflected light from a recording layer of the optical disk farther from the objective lens after being diffracted by the hologram shown in FIG. 9 in the light receiving device shown in FIG. 2.

FIG. 10 illustrates a state of the reflected light from the recording layer nearer to the objective lens and the reflected light from the recording layer farther from the objective lens after being diffracted by the hologram 20 described above. As the reflected light from the recording layer 8b is applied to the area AB as mentioned above, flares of the reflected light 11 from the recording layer 8b is applied only to the above-mentioned light receiving surfaces 'a' and 'b' uniformly. As a result, the focus error signal expressed by:

$$FES = a - b,$$

the tracking error signal expressed by:

$$TES = (c-d) - ((e+g) - (f+h)),$$

the tracking cross signal expressed by:

$$TCS = (c+d) - \alpha((e+g) + (f+h)),$$

the lens position signal expressed by:

$$LPS=(c-d)+\alpha((e+g)-(f+h)), \text{ and}$$

the information reproducing signal expressed by:

$$RFS=a+b+c+d$$

can be properly detected respectively.

Figure 11:
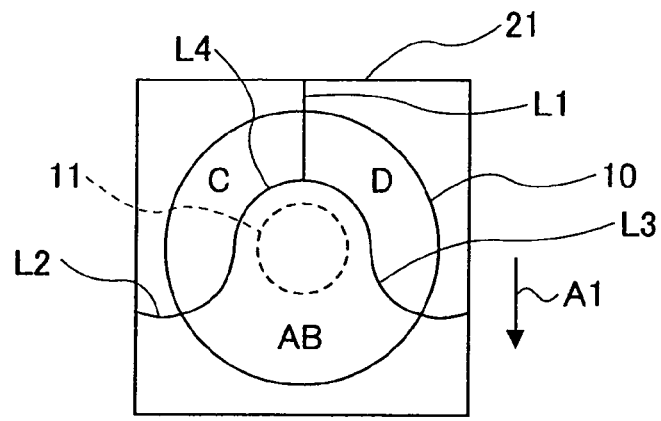
FIG. 11 shows a configuration of a hologram provided in an optical pickup apparatus according to a second embodiment of the present invention.

FIG. 11 illustrates a hologram 21 provided in an optical pickup apparatus in a second embodiment of the present invention, which hologram also acts as a beam splitting device.

In the second embodiment, instead of the hologram 4 provided in the above-described optical pickup apparatus shown in FIG. 1, the hologram 21 is formed on the glass plate 2. This hologram 21 is such that the positions of the straight lines L2 and L3 which divides the hologram into the area AB and areas C and D in the hologram 20 described above with reference to FIG. 9 are shifted in a direction indicated by an arrow A1 shown in FIG. 11, i.e., in the direction opposite to the side of the separating line L1 which defines the areas C and D with respect to the center of the reflected light 10 from the recording layer 8a. Thereby, the areas by which the push-pull signal is detected are increased.

By configuring the hologram 21 as described above, as in the above-described first embodiment, the adverse influence caused by the flares of the reflected light 11 from the recording layer 8b can be reduced effectively, and also, the qualities of the tracking error signal expressed by:

$$TES=(c-d)-\alpha((e+g)-(f+h)),$$

the tracking cross signal expressed by:

$$TCS=(c+d)-\alpha((e+g)+(f+h)), \text{ and}$$

the lens position signal expressed by:

$$LPS=(c-d)+\alpha((e+g)-(f+h))$$

are improved.

Figure 12:
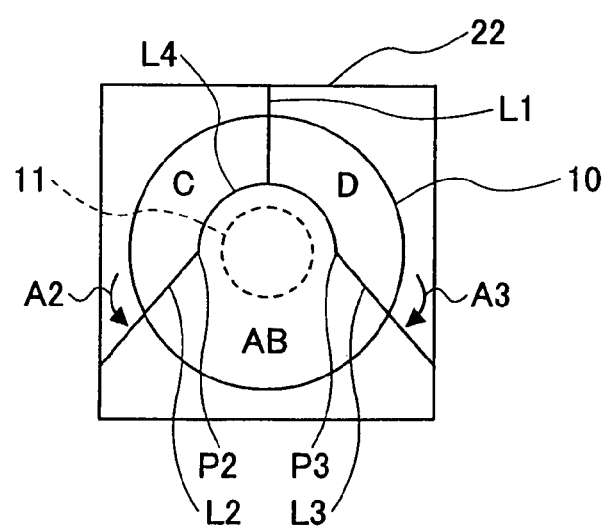
FIG. 12 shows a configuration of a hologram provided in an optical pickup apparatus according to a third embodiment of the present invention.

FIG. 12 illustrates a hologram 22 provided in an optical pickup apparatus in a third embodiment of the present invention, which hologram also acts as a beam splitting device.

In the third embodiment, instead of the hologram 4 provided in the above-described optical pickup apparatus shown in FIG. 1, the hologram 22 is formed on the glass plate 2. This hologram 22 is such that the positions of the straight lines L2 and L3 which divides the hologram into the area AB and areas C and D in the hologram 20 described above with reference to FIG. 9 are rotated in respective directions indicated by arrows A2 and A3 shown in FIG. 12 about the points P2 and P3 at which the curved line L4 and the straight lines L2 and L3 are connected shown in FIG. 9, respectively. Thereby, the areas by which the push-pull signal is detected are increased.

By configuring the hologram 22 as described above, as in the above-described first embodiment, the adverse influence caused by the flares of the reflected light 11 from the recording layer 8b can be reduced effectively, and also, the qualities of the tracking error signal expressed by:

$$TES=(c-d)-\alpha((e+g)-(f+h)),$$

the tracking cross signal expressed by:

$$TCS=(c+d)-\alpha((e+g)+(f+h)), \text{ and}$$

the lens position signal expressed by:

$$LPS=(c-d)+\alpha((e+g)-(f+h))$$

are improved.

Figure 13:
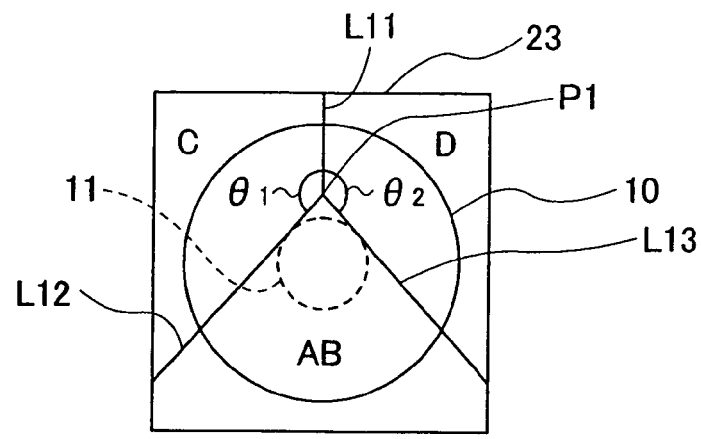
FIG. 13 shows a configuration of a hologram provided in an optical pickup apparatus according to a fourth embodiment of the present invention.

FIG. 13 illustrates a hologram 23 provided in an optical pickup apparatus in a fourth embodiment of the present invention, which hologram also acts as a beam splitting device.

In the fourth embodiment, instead of the hologram 4 provided in the above-described optical pickup apparatus shown in FIG. 1, the hologram 23 is formed on the glass plate 2.

In order to divide the hologram 23 into three areas, three separating lines L11, L12 and L13 each of which is a straight line are used as shown in FIG. 13, where each of at least two angles θ1 and θ2 formed between respective ones of these separating lines L11, L12 and L13 is larger than 90 degrees as shown in FIG. 13.

It is preferable that the point P1 at which these three straight lines L11, L12 and L13 are connected lies outside of a zone of the optical spot formed by the above-mentioned reflected light 11. Also, it is preferable that the above-mentioned angles θ1 and θ2 formed between the separating line L11 for the areas C and D and the respective ones of the other two separating lines L12 and L13 are determined such that the other two separating lines L12 and L13 may be tangential lines to the circle of the above-mentioned optical spot 11, as shown in FIG. 13.

By configuring the hologram 23 as described above, the optical spot formed by the reflected light 11 is completely included in the area AB, and, thus, it is possible to reduce the adverse influence caused by the flares. Furthermore, the qualities of the tracking error signal expressed by:

$$TES=(c-d)-\alpha((e+g)-(f+h)),$$

the tracking cross signal expressed by:

$$TCS=(c+d)-\alpha((e+g)+(f+h)), \text{ and}$$

the lens position signal expressed by:

$$LPS=(c-d)+\alpha((e+g)-(f+h))$$

are improved.

Figure 14:
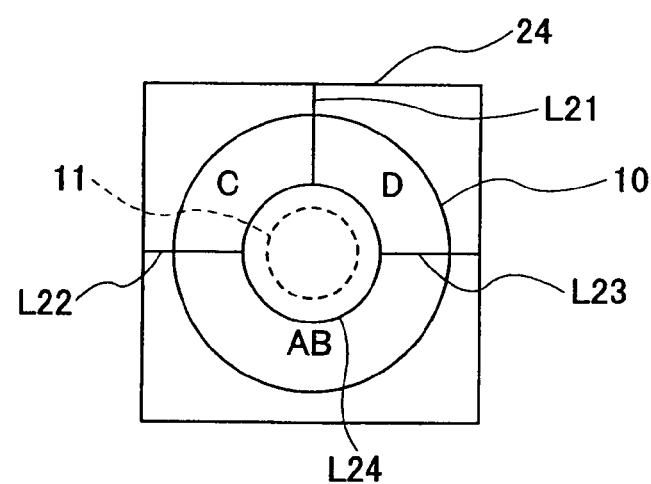
FIG. 14 shows a configuration of a hologram provided in an optical pickup apparatus according to a fifth embodiment of the present invention.

FIG. 14 illustrates a hologram 24 provided in an optical pickup apparatus in a fifth embodiment of the present invention, which hologram also acts as a beam splitting device.

In the fifth embodiment, instead of the hologram 4 provided in the above-described optical pickup apparatus shown in FIG. 1, the hologram 24 is formed on the glass plate 2.

The hologram 24 has total four areas, i.e., two areas C and D for detecting the push-pull signal, an area AB for detecting the focus error signal and an area I including the center of the optical axis, which four areas are defined by four separating lines L21, L22, L23 and L24. Specifically, by the circular separating line L24 having the center coincident with the optical axis and having the diameter larger than the optical spot of the reflected light 11, the area I is defined from the others. Then, the other areas C, D and AB are defined by the three straight separating lines L21, L22 and L23.

Figure 15:
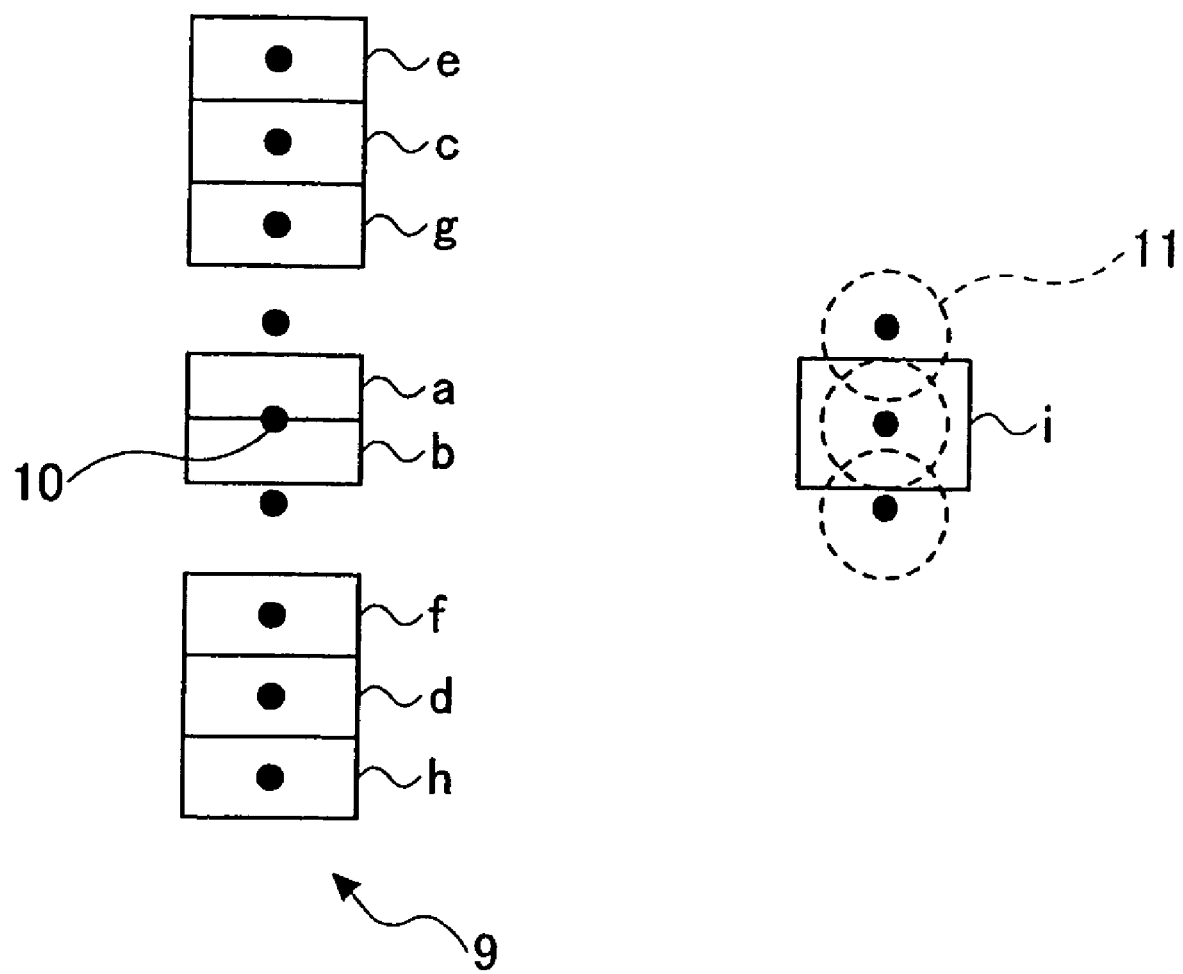
FIGS. 15A and 15B illustrate a state of the reflected light diffracted by the hologram shown in FIG. 14 in a light receiving device according to the fifth embodiment.

FIGS. 15A and 15B illustrate a state of the reflected light after being diffracted by the hologram 24 shown in FIG. 14. By means of the grating 3 shown in FIG. 2, the beam reflected by the optical disk 8 is split into three beams, i.e., a main beam and two sub-beams, which beams are then split by means of the hologram 24. As a result, the reflected light 10 from the recording layer 8a forms total 12 optical spots, while the reflected light 11 from the recording layer 8b do not focus on the light receiving device 9 and form three flares there.

In this embodiment, the light receiving device 9 has nine light receiving surfaces, 'a' through 'i', as shown in FIGS. 15A and 15B. Beams created by the diffraction performed on the light with the four areas AB, C, D and I shown in FIG. 14 of the hologram 24 and the respective light receiving surfaces to which the these beams are applied have the following relationship:

The diffracted light of the main beam from the area AB is received between the light receiving surfaces 'a' and 'b';

The diffracted light of the main beam from the area C is received by the light receiving surface 'c';

The diffracted lights of the sub-beams from the area C are received by the light receiving surfaces 'e' and 'g', respectively;

The diffracted light of the main beam from the area D is received by the light receiving surface 'd';

The diffracted lights of the sub-beams from the area D are received by the light receiving surfaces 'f' and 'h' respectively; and The diffracted light of the main beam from the area I is received by the light receiving surface 'i'.

The diffracted lights of the sub-beams from the area AB are received outside of the light receiving surface 'a' and the light receiving surface 'b', respectively; and the diffracted lights of the sub-beams from the area I are received outside of the light receiving surface 'i', respectively. In other words, these diffracted lights are not substantially received by the light receiving device 9, as shown in FIGS. 15A and 15B.

By expressing the various signals obtained from the respective light receiving surfaces 'a' through 'i' by the same symbols 'a' through 'i' respectively, the focus error signal FES is expressed by:

$$FES=a-b.$$

A tracking error signal TES is expressed by:

$$TES=(c-d)-\alpha((e+g)-(f+h)).$$

A tracking cross signal TCS is expressed by:

$$TCS=(c+d)-\alpha((e+g)+(f+h)).$$

A lens position signal LPS is expressed by:

$$LPS=(c-d)+\alpha((e+g)-(f+h))$$

An information reproducing signal RFS is expressed by:

$$RFS=a+b+c+d+i.$$

Thus, as the flare of the reflected light from the recording layer 8b is applied only to the light receiving surface 'i', the above-mentioned respective ones of the various signals can be properly detected.

The present invention is not limited to these embodiments described above. For example, although the hologram device is applied as the beam splitting device in each of these embodiments, another optical device such as a prism, a lens or so may also be applied instead.

Recently, as a large-information-storage capacity optical disk, a DVD (digital versatile disk) has spread. DVD-RAM•WO, DVD-R, DVD+R, DVD-RAM, DVD-RW and DVD+RW are recordable disks. Thereamoung, DVD-RAM•WO, DVD-R and DVD+R are write-once disks (writing can be made only once), while DVD-RAM, DVD-RW and DVD+RW are rewriteable disks (writing can be made a plurality of times). Information recording/reproduction is made onto these various types of DVDs, i.e., optical disks by means of an optical disk drive apparatus having a configuration as shown in FIG. 16.

Figure 16:
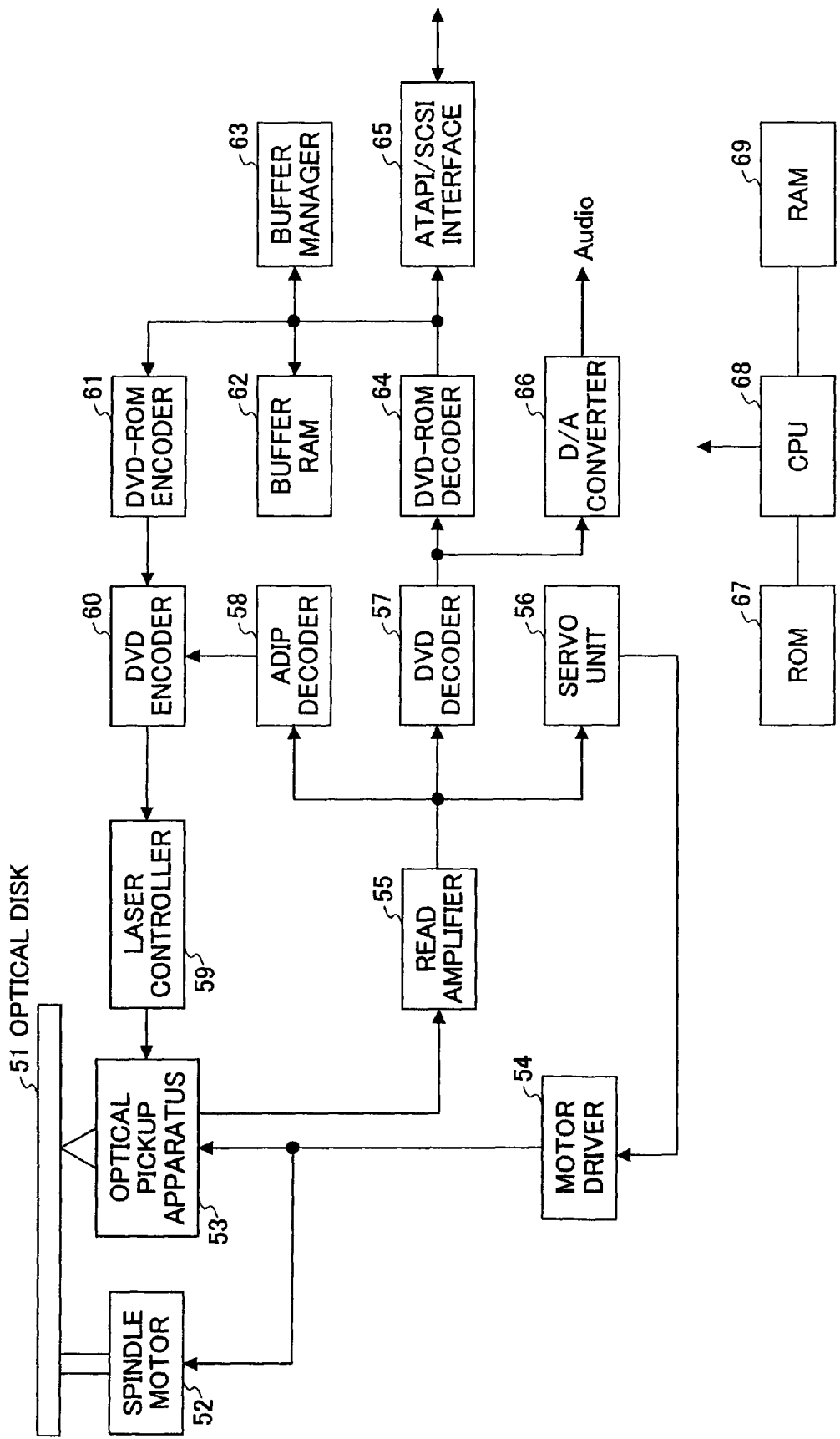
FIG. 16 shows a general functional block diagram of an optical disk drive apparatus according to an embodiment of the present invention.

FIG. 16 shows a general functional block diagram of an optical disk drive apparatus according to one embodiment of the present invention. As shown, this apparatus handles an optical disk 51, and includes a spindle motor 52, an optical pickup apparatus 53, a motor driver 54, a read amplifier 55, a servo unit 56, a DVD decoder 57, an ADIP decoder 58, a laser controller 59, a DVD encoder 60, a DVD-ROM encoder 61, a buffer RAM 62, a buffer manager 63, a DVD-ROM decoder 64, a ATAPI/SCSI interface 65, a D/A converter 66, a ROM 67, a CPU 68, and a RAM 69. The optical pickup apparatus applies a laser beam LB onto the optical disk 51, and an audio output signal Audio is obtained from the D/A converter 66 finally.

In FIG. 16, arrows denote directions in which data flows, and the CPU 67 controls the respective blocks although lines denoting signal connection between blocks therefor are omitted. In the ROM 67, control programs written in a code which can be recognized by the CPU 68 is stored. Upon turning on of a power supply to the optical disk drive apparatus, the above-mentioned control programs are loaded into a main memory (not shown), the CPU 68 controls operation of the respective parts according to the programs, and stores data or so necessary for the control into the RAM 69.

Configuration and operation in the optical disk drive apparatus will now be described.

The optical disk 51 is rotated by the spindle motor 52. The spindle motor 52 is controlled by the motor driver 54 and servo unit 56 so that the linear velocity or angular velocity is made constant. The linear velocity or angular velocity can be controlled stepwise.

The optical pickup apparatus 53 has therein an optical system according to any of the first through fifth embodiments described above with reference to FIGS. 1 through 4 and 9 through 15B, and also, has a focus actuator, a tracking actuator, the light receiving device 9 (see FIG. 1), and a position sensor. The optical pickup apparatus 53 applies the laser beam LB onto the optical disk 51 as mentioned above. Further, the optical pickup apparatus 53 can be moved in a sledge direction by a seeking motor. These focus actuator, tracking actuator and seeking motor are controlled by the motor driver 54 and servo unit 56 based on signals obtained from the light receiving device and position sensor, so that the spot formed by the laser beam LB may be located at a target position on the optical disk 51.

Then, at a time of reading operation, a reproduced signal obtained by the optical pickup apparatus 53 is amplified by the read amplifier 55 and binarized. After that, the signal is input to the DVD decoder 57. The binarized signal thus input is 8/16-demodulated by the DVD decoder 57. The recorded data in the optical disk 51 is modulated (8/16 modulation) in a manner in which 8 bits are collected as a unit, and, the above-mentioned decoding operation converts the 8 bits into 16 bits. In this case, coupling bits are added such that the respective numbers of '1' and '0' are made equal on average. This process is called 'DC component suppression', and thereby, slice level fluctuation in the reproduced signal after having undergone a DC cutting process can be suppressed.

The thus-obtained demodulated data undergoes de-interleave and error correction. After that, the data is input to the DVD-ROM decoder 64, and, in order to improve reliability, further error correction is performed thereon. The data having undergone two times of error correction operations are once stored in the buffer RAM 62 by the buffer manager 63. Then, after the thus-stored data becomes equal to sector data, the data is then transferred to a host computer (not shown) via the ATAPI/SCSI interface 65. In case of music data, data output from the DVD decoder 57 is input to the D/A converter 66, and an analog audio output signal Audio is obtained therefrom.

At a time of writing, data sent from the host computer via the ATAPI/SCSI interface 65 is once stored in the buffer RAM 62 by the buffer manager 63. After that, writing operation is started. In this case, it is necessary to previously position the laser spot at a position on the optical disk 51 from which writing is to be started. This position is obtained from a wobble signal in a form of wobbling of track previously provided in the optical disk 51 in case of DVD+RW/+R. In case of DVD-RW/-R, instead of the wobble signal, a land pit is used for the same purpose. In case of DVD-RAM/RAM•WO, a pre-pit is used for the same purpose.

In the wobble signal in the DVD+RW/+R disk, address information called ADIP (address in pre-groove) is included, and this information is extracted by the ADIP decoder 58. Furthermore, a synchronization signal extracted by this ADIP decoder 58 is input to the DVD encoder 60, and thereby, writing to the optical disk 51 at a proper position is ensured. The data in the buffer RAM 62 is processed by the DVD-ROM encoder 61 or the DVD encoder 60 so that addition of error correction code or interleave is performed, and then is written to the optical disk 51 through the laser controller 59 and optical pickup apparatus 53. The address information may be obtained from the land pit or pre-pit instead.

Figure 17:
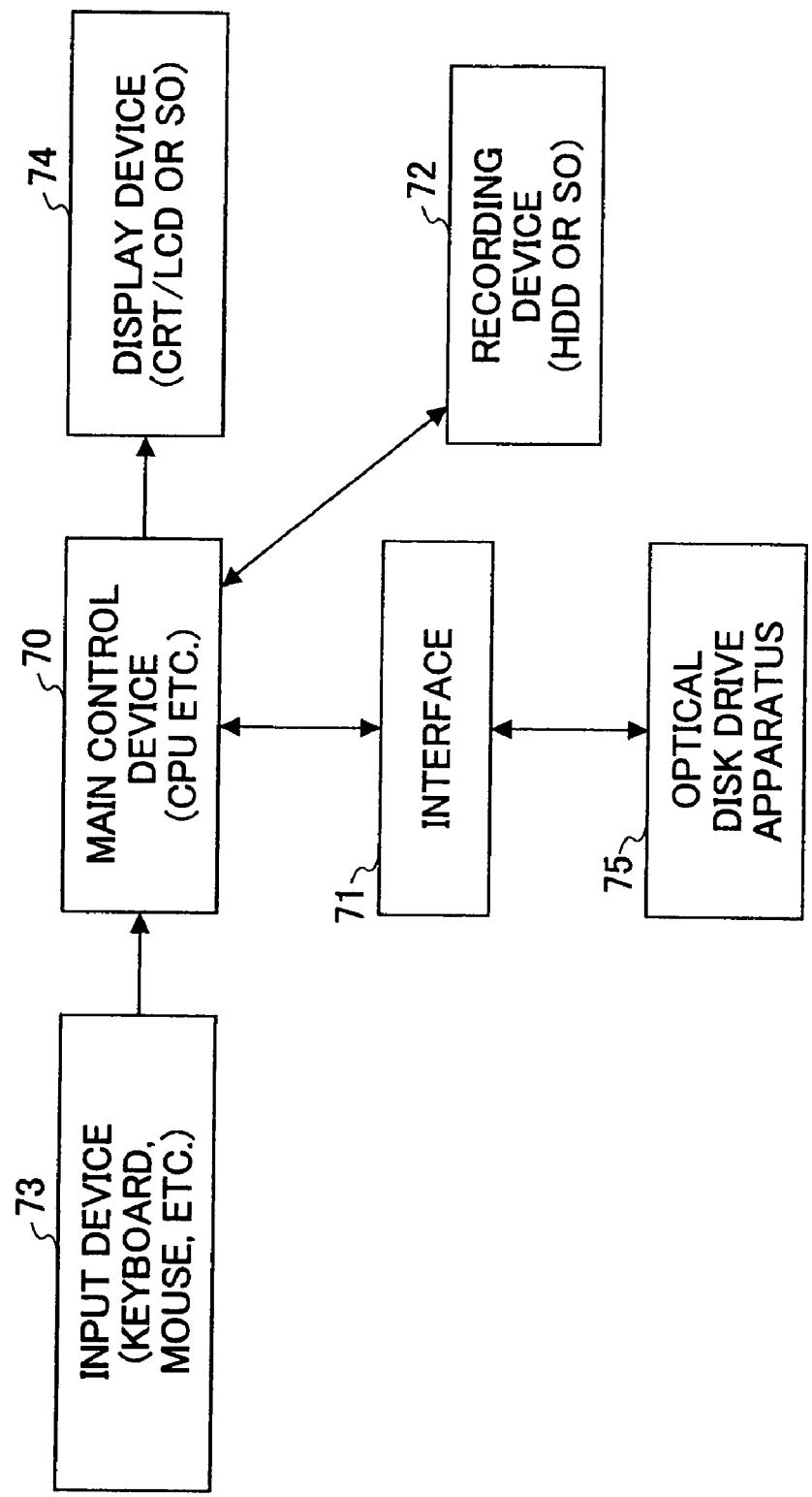
FIG. 17 shows a general block diagram of an information processing apparatus employing the optical disk drive apparatus shown in FIG. 16.

FIG. 17 shows a block diagram of an information processing apparatus employing the above-mentioned optical disk drive apparatus shown in FIG. 16. As shown, this apparatus includes a main control device 70, an interface 71, a recording device 72, an input device 73, a display device 74, the optical disk drive apparatus 75 shown in FIG. 16, and so forth. The main control device includes a CPU, a microcomputer, a main memory and so forth, and controls the entirety of the information processing apparatus.

The interface 71 provides a bidirectional communication interface between the optical disk drive apparatus 75 and the main control device 70, and conforms to standard interfaces of ATAPI, SCSI and so forth. The interface 71 is connected with the interface 65 in the optical disk drive apparatus shown in FIG. 16. A connection manner between the respective interfaces is not only cable connection employing a communication cable (for example, a SCSI cable) but also wireless connection employing infrared ray or so.

In the recording device 72 such as a hard disk drive (HDD), programs written in a code recognizable by the microcomputer of the main control device 70 are stored. Upon turning on of a power supply to the information processing apparatus, the above-mentioned programs are loaded into the main memory of the main control device 70.

The display device 74 includes a CRT, a liquid crystal device, a plasma display device or so, and displays various types of information from the main control device 70. The input device 73 includes a keyboard, a mouse, a pointing device or so, and provides information input by the user to the main control device 70. Information from the input device 73 may be provided by air to the main control device 70. For example, a CRT with a touch panel or so which includes both the display device 70 and input device 73 in a unit may be applied.

The information processing apparatus has an operation system (OS) mounted therein, and all the devices/components included in the information processing apparatus are managed by the OS.

Thus, according to the present invention in an aspect concerning the above-mentioned first through fifth embodiments, it is possible to reduce the adverse influence exerted onto the focus error signal (FES), tracking error signal (TES), tracking cross signal (TCS), lens position signal (LPS), information reproducing signal (RFS) caused due to reflected light from the recording layer of the optical disk farther from the objective lens when focus occurs in the recording layer of the optical disk nearer to the objective lens.

Sixth through ninth embodiments of the present invention will now be described with reference to figures. Each of these embodiments has a configuration same as that of the related art described above with reference to FIGS. 5 through 8 except the following configuration. The same reference numerals are given to the same devices/components in the configuration described above with reference to FIGS. 5 through 8.

Figure 18:
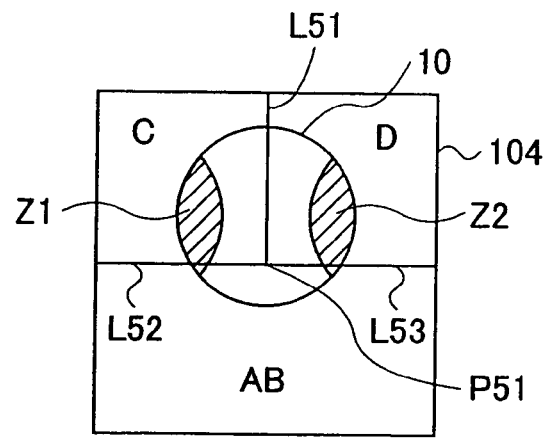
FIG. 18 shows a configuration of a hologram provided in an optical pickup apparatus according to a sixth embodiment of the present invention.

FIG. 18 illustrates a configuration of the above-mentioned hologram 104 and a position of the reflected light therein according to the sixth embodiment.

Figure 5:
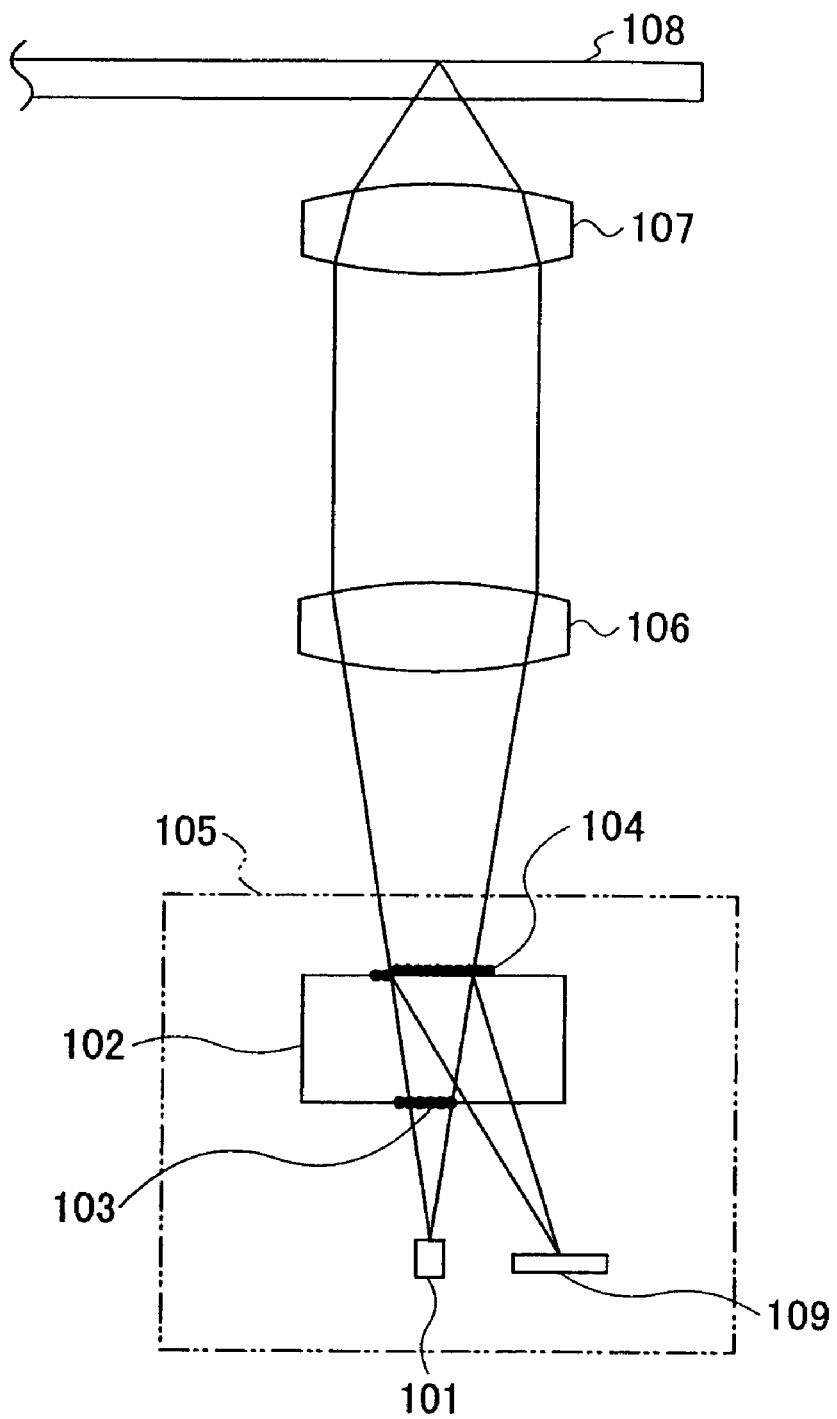
FIG. 5 illustrates another general configuration of an optical system of an optical pickup apparatus of an optical disk drive apparatus.
Figure 6:
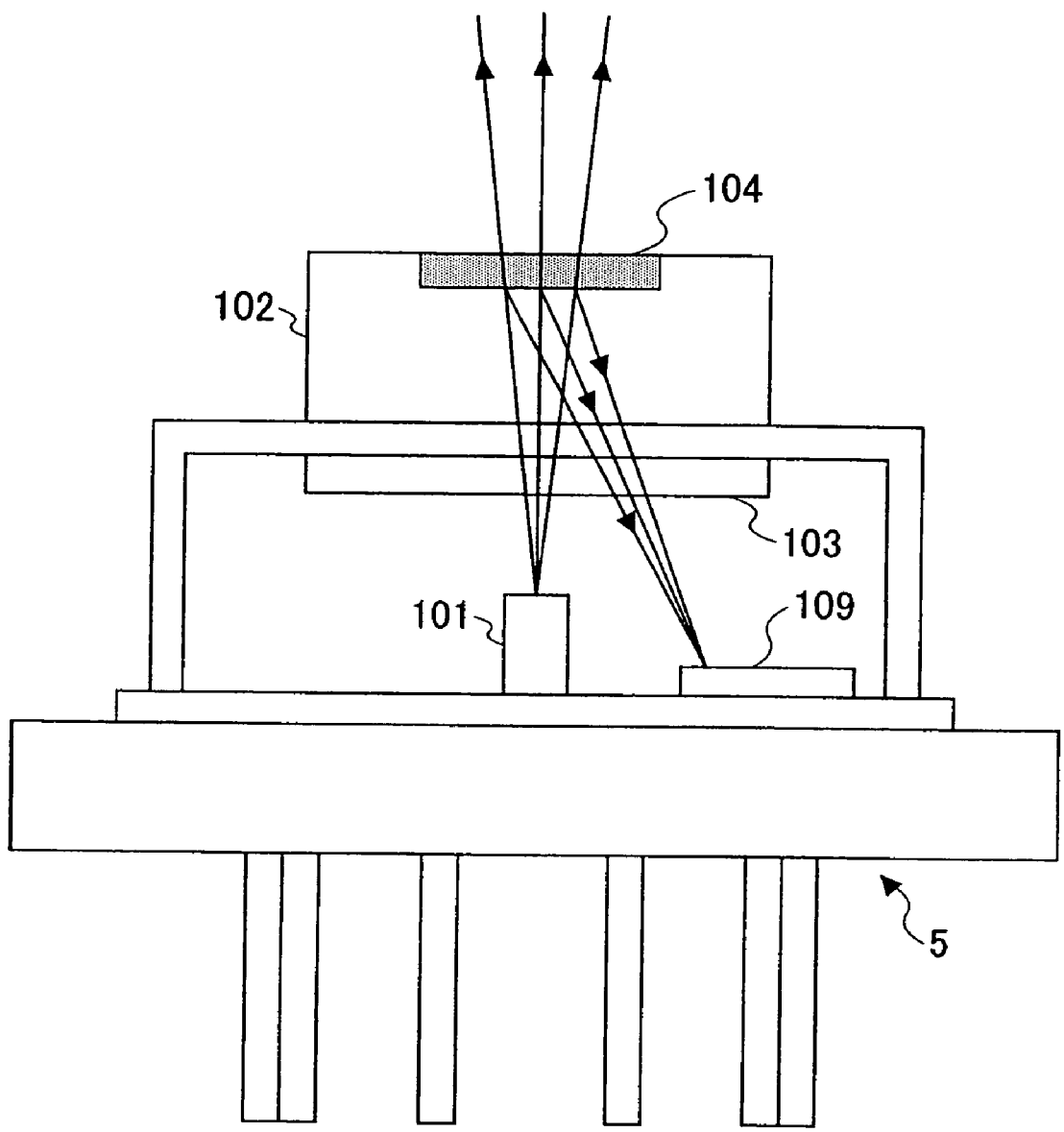
FIG. 6 shows an internal side view of a hologram pickup shown in FIG. 5.
Figure 7:
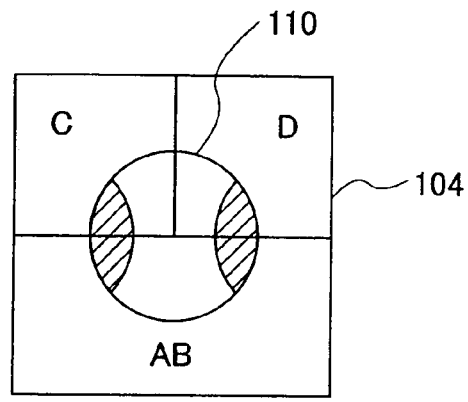
FIG. 7 illustrates a state of reflected light from a recording layer nearer to an objective lens and reflected light from a recording layer farther from the objective lens in a hologram shown in FIG. 6.
Figure 8:
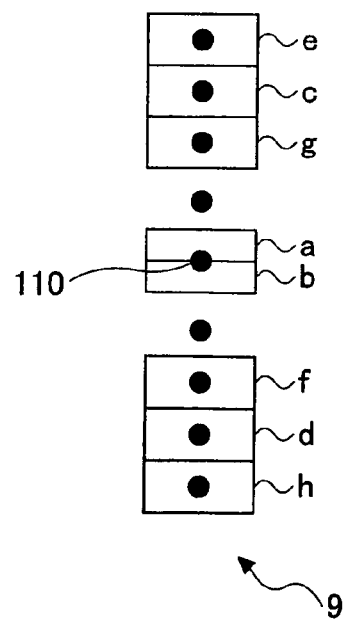
FIG. 8 illustrates a state of the reflected light diffracted by the hologram shown in FIG. 7 in a light receiving device shown in FIG. 6.

According to the sixth embodiment, with respect to the hologram 104 in the optical pickup apparatus shown in FIG. 5, the position of the optical axis of the reflected light from the optical disk 108 applied to the hologram 104 is largely shifted to the side of the above-mentioned two areas C and D for detecting the push-pull signal as shown in FIG. 18 (also see FIG. 7 in a comparing manner).

The push-pull signal is obtained from the hatched zones in FIG. 7 as mentioned above of the spot of the reflected light 110. In the case of FIG. 7 described above, the point at which the separating lines for the areas AB, C and D are connected coincides with the center of the optical axis of the reflected light 110, and in that case, approximately 50% of these hatched zones in the area rate is included in the areas C and D as shown in FIG. 7.

In contrast thereto, according to the sixth embodiment of the present invention, as shown in FIG. 18, the configuration is made such that the optical axis of the reflected light 110 applied is largely shifted toward the areas C and D with respect to the above-mentioned point P51 at which the separating lines L51, L52 and L53 are connected. As a result, more than 50% of the zones Z1 and Z2 of the reflected light 110 from which the push-pull signal is obtained is made to be included in the areas C and D for detecting the push-pull signal as shown in FIG. 18.

By providing the above-mentioned configuration, it is possible to obtain a large amount of light for detecting the push-pull signal. In particular, as more than 50% of the light amount of the push-pull signal of the reflected light 110 from the optical disk 108 is made to be applied within the areas C and D as mentioned above, it is possible to properly detect information therefrom such as addresses or so written in the pre-groove of the DVD+RW/+R mentioned above.

As the configuration is provided such that the reflected light 110 is made to be applied to the hologram 104 as shown in FIG. 18, the light amount received by the area AB is reduced. As a result, there may occur a problem in which operation of a circuit for detecting signals with a use of the light receiving signals obtained from the areas AB, C and D cannot be performed properly. For example, a problem may occur in which, as the light amount received by the areas C and D are increased as mentioned above, a circuit generating the push-pull signal is saturated, or, as the light amount received by the area AB may become too small to generate the focus error signal properly. The seventh embodiment of the present invention is devised so as to solve this problem.

Figure 19:
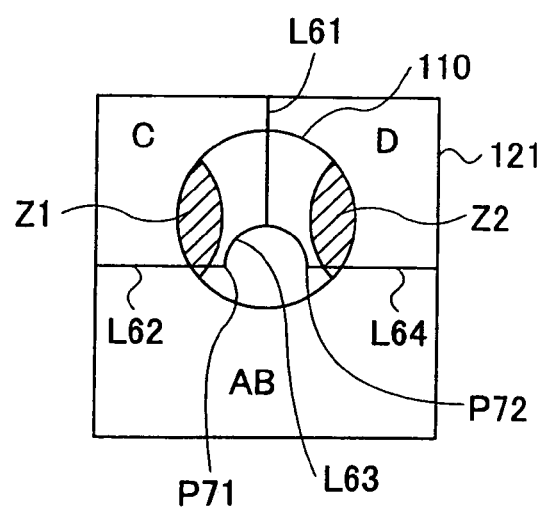
FIG. 19 shows a configuration of a hologram provided in an optical pickup apparatus according to a seventh embodiment of the present invention.

FIG. 19 shows a configuration of a hologram provided in an optical pickup apparatus according to the seventh embodiment of the present invention as well as a position of the reflected light 110 applied thereto. According to the seventh embodiment, instead of the hologram 104 shown in FIG. 18, a hologram 121 is formed on the glass plate 102.

In the hologram 121 shown in FIG. 19, in a central portion, portions of the separating line L52 and L53 between the area AB and areas C and D (in FIG. 18) around the point P51 at which the separating lines L51, L52 and L53 are connected are curved toward the side of the areas C and D but in a manner in which the area AB may not overlaps the hatched zones Z1 and Z2 for generating the push-pull signal as shown in FIG. 19. In other words, the separating lines L51, L52 and L53 in FIG. 18 defining the areas AB, C and D are formed with three straight lines L61, L62 and L64, and a curved line L63 as shown in FIG. 19.

By configuring the hologram in the seventh embodiment as described above, it is possible to increase the light amount received by the area AB in comparison to the sixth embodiment shown in FIG. 18. Accordingly, it is possible to make approximately equal the light amounts received by the areas A and the areas C and D, and also, while still increasing only the light amount for generating the push-pull signal. In fact, as shown in FIG. 19, a large area of the zones Z1 and Z2 is still included in the areas C and D as in the case of FIG. 18, and thus, the light amount for generating the push-pull signal can be sufficiently provided thereby. As a result, it is possible to eliminate the possibility of the above-mentioned problem in which the light amount is too small to generate the focus error signal properly while securing the light amount for generating the push-pull signal.

Figure 20:
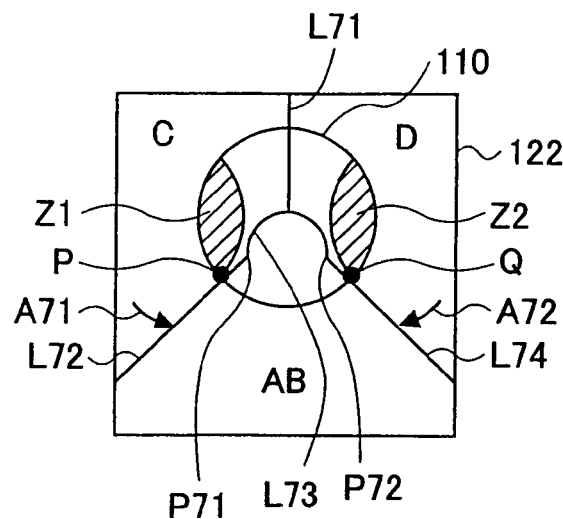
FIG. 20 shows a configuration of a hologram provided in an optical pickup apparatus according to an eighth embodiment of the present invention.

FIG. 20 shows a configuration of a hologram provided in an optical pickup apparatus according to the eight embodiment of the present invention, and a position of the reflected light applied thereto. According to the eighth embodiment, instead of the hologram 104 shown in FIG. 18, a hologram 122 is formed on the glass plate 102 shown in FIG. 20.

This hologram 122 is such that straight lines L62 and L64 which divides the hologram into the area AB and areas C and D in the hologram 121 described above with reference to FIG. 19 are rotated in respective directions indicated by arrows A71 and A72 shown in FIG. 20 about the points P71 and P72 at which the curved line L63 and the straight lines L62 and L64 are connected shown in FIG. 19, respectively. As a result, the separating lines L72 and L74 shown in FIG. 20 are provided.

By configuring the hologram 122 as described above, it is possible to further increase the area receiving the light amount for detecting the push-pull signal in comparison to the hologram 121 shown in FIG. 19.

In this configuration, by setting the above-mentioned straight lines L72 and L74 rotated as mentioned above so that these lines L72 and L74 may be tangential lines to the hatched zones Z1 and Z2, or these lines L72 and L74 pass through points P and Q which are the respective ends of the zones Z1 and Z2 on the side of the area AB, it is possible that the hatched zones Z1 and Z2 are completely included in the areas C and D, thus, the push-pull signal can be satisfactory detected, while the light amount received by the area AB can be secured too.

Figure 21:
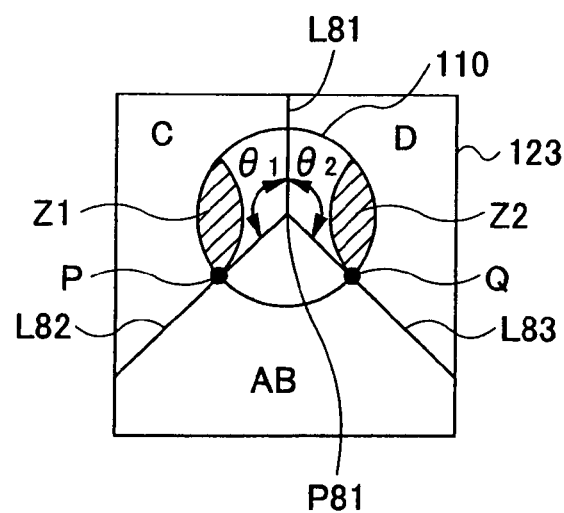
FIG. 21 shows a configuration of a hologram provided in an optical pickup apparatus according to a ninth embodiment of the present invention.

FIG. 21 shows a configuration of a hologram 123 provided in an optical pickup apparatus according to the ninth embodiment of the present invention as well as a position of the reflected light applied thereto. According to the ninth embodiment, instead of the hologram 104 to which the reflected light 110 is applied as shown in FIG. 18, the hologram 123 is formed on the glass plate 102 shown in FIG. 21.

In the hologram 123, a point P81 at which the areas AB, C and D are connected together is shifted toward the side of the areas C and D with respect to the optical axis of the reflected light 110 applied, the areas AB, C and D are defined by three straight lines L81, L82 and L83 acting as separating lines extending from the above-mentioned connecting point P81 in a manner such that the area rate of parts of the hatched zones Z1 and Z2 included in the areas C and D with respect to the entire area of the zones Z1 and Z2 may be more than 50%.

Furthermore, each of the separating lines L82 and L83 forms an angle θ1/θ2 lager than 90 degrees with respect to the separating line L81 for the areas C and D, as shown in FIG. 21.

By configuring as described above, it is possible to increase the area receiving the light amount for detecting the push-pull signal in comparison to the hologram 104 shown in FIG. 18. In the ninth embodiment, although the separating lines L81, L82 and L83 only include straight lines, same advantage as that in the case of FIG. 20 can be expected.

In this configuration, by setting the two separating lines L82 and L83 to form the angles θ1 and θ2 such that these lines L82 and L83 are tangential lines to the hatched zones Z1 and Z2, respectively, the hatched zones Z1 and Z2 are included by the areas C and D so that the push-pull signal can be satisfactorily detected therefrom, and also, the light amount received by the area AB can be secured too.

The present invention is not limited to these embodiments described above. For example, although the hologram device is applied as the beam splitting device in each of these embodiments, another optical device such as a prism, a lens or so may be applied instead. Especially, in the configuration shown in FIG. 21, the separating lines include only straight lines as mentioned above, and thus, this configuration can be easily achieved by prisms, for example.

Recently, as a large-information-storage capacity optical disk, a DVD (digital versatile disk) has spread. DVD-RAM•WO, DVD-R, DVD+R, DVD-RAM, DVD-RW, DVD+RW are recordable disks. Thereamoung, DVD-RAM•WO, DVD-R and DVD+R are write-once disks (writing can be made only once), while DVD-RAM, DVD-RW and DVD+RW are rewriteable disks (writing can be made a plurality of times). Information recording/reproduction is made onto these various types of DVDs, i.e., optical disks by means of an optical disk drive apparatus having a configuration as shown in FIG. 22.

Figure 22:
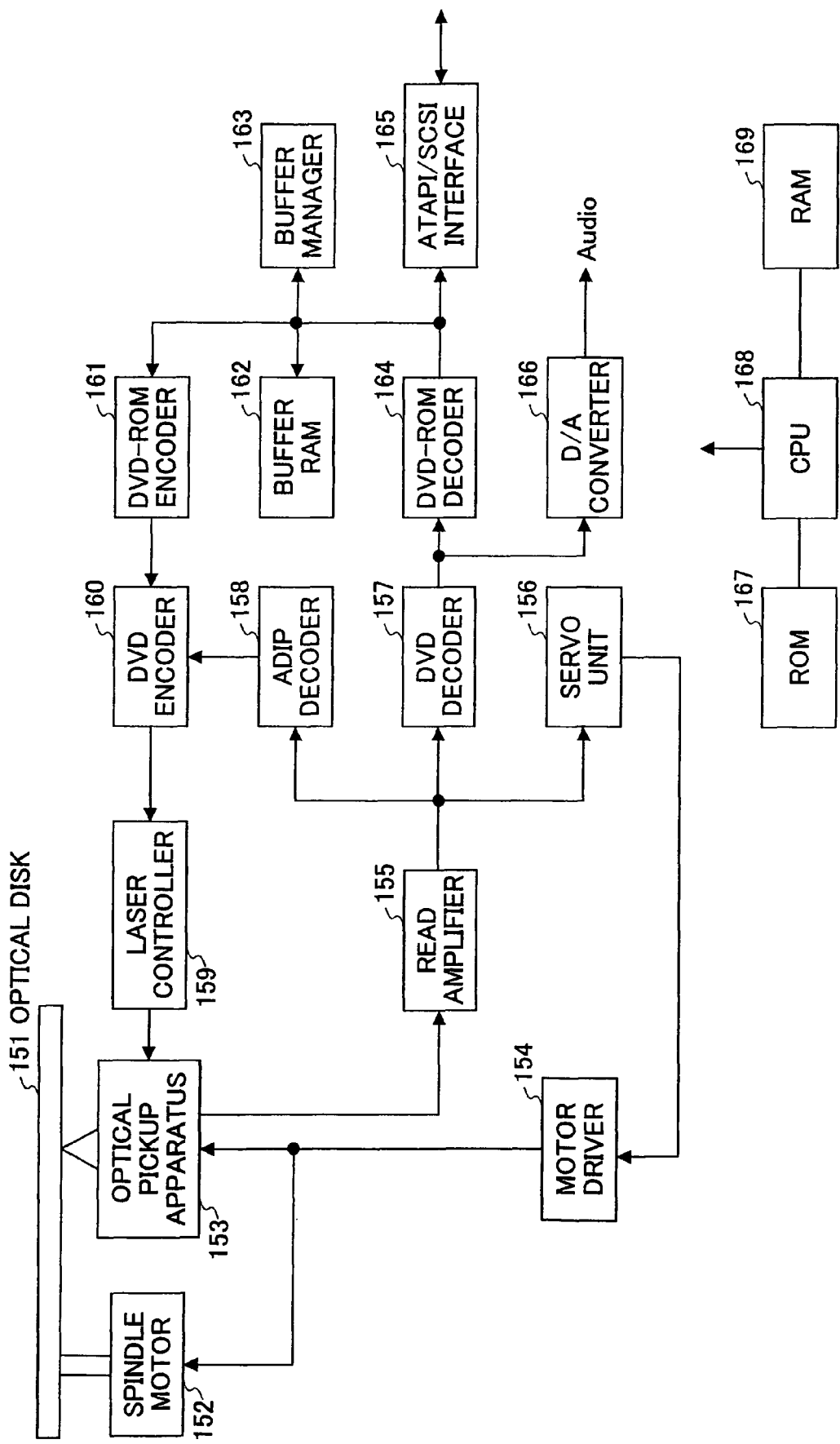
FIG. 22 shows a general functional block diagram of an optical disk drive apparatus according to another embodiment of the present invention.

FIG. 22 shows a general functional block diagram of an optical disk drive apparatus according to another embodiment of the present invention. As shown, this apparatus handles an optical disk 151, and includes a spindle motor 152, an optical pickup apparatus 153, a motor driver 154, a read amplifier 155, a servo unit 156, a DVD decoder 157, an ADIP decoder 158, a laser controller 159, a DVD encoder 160, a DVD-ROM encoder 161, a buffer RAM 162, a buffer manager 163, a DVD-ROM decoder 164, a ATAPI/SCSI interface 165, a D/A converter 166, a ROM 167, a CPU 168 and a RAM 169. The optical pickup apparatus applies a laser beam LB onto the optical disk 151, and an audio output signal Audio is obtained from the D/A converter 166 finally.

In FIG. 22, arrows denote directions in which data/signal flows, and the CPU 167 controls the respective blocks although lines denoting signal connection between blocks therefor are omitted. In the ROM 167, control programs written in a code which can be recognized by the CPU 168 are stored. Upon turning on of a power supply to the optical disk drive apparatus, the above-mentioned control programs are loaded into a main memory (not shown), the CPU 168 controls operation of the respective parts according to the programs, and temporarily stores data or so necessary for the control into the RAM 169.

Configuration and operation in the optical disk drive apparatus will now be described.

The optical disk 151 is rotated by the spindle motor 152. The spindle motor 152 is controlled by the motor driver 154 and servo unit 156 so that the linear velocity or angular velocity is made constant. The linear velocity or angular velocity can be controlled stepwise.

The optical pickup apparatus 153 has therein an optical system in any of the sixth through ninth embodiments described above with reference to FIGS. 5 through 8 and 18 through 21, and also, has a focus actuator, a tracking actuator, the light receiving device 109 (see FIG. 5), and a position sensor. The optical pickup apparatus 153 applies the laser beam LB onto the optical disk 151 as mentioned above. Further, the optical pickup apparatus 153 can be moved in a sledge direction by a seeking motor. These focus actuator, tracking actuator and seeking motor are controlled by the motor driver 154 and servo unit 156 based on signals obtained from the light receiving device and position sensor, so that the spot formed by the laser beam LB is located at a target position on the optical disk 151.

Then, at a time of reading operation, a reproduced signal obtained by the optical pickup apparatus 153 from the optical disk is amplified by the read amplifier 155 and binarized. After that, the signal is input to the DVD decoder 157. The binarized signal thus input is 8/16-demodulated by the DVD decoder 157. The recorded data in the optical disk 151 is modulated (8/16 modulation) in a manner in which 8 bits are collected as a unit, and, the above-mentioned decoding operation converts 8 bits into 16 bits. In this case, coupling bits are added such that the numbers of '1' and '0' are made equal on average. This process is called 'DC component suppression', and thereby, slice level fluctuation of the reproduced signal after having undergone a DC cutting process is suppressed.

The thus-obtained demodulated data undergoes de-interleave and error correction. After that, the data is input to the DVD-ROM decoder 164, and, in order to improve reliability, further error correction is performed thereon. The data having undergone two times of error correction operations are once stored in the buffer RAM 162 by the buffer manager 163. Then, after the thus-stored data become equal to sector data, the data is transferred to a host computer (not shown) via the ATAPI/SCSI interface 165. In case of music data, data output from the DVD decoder 157 is input to the D/A converter 166, and an analog audio output signal Audio is obtained therefrom.

At a time of writing, data sent from the host computer via the ATAPI/SCSI interface 165 is once stored in the buffer RAM 162 by the buffer manager 163. After that, writing operation is started. In this case, it is necessary to previously position the laser spot at a position on the optical disk from which writing is to be started. This position is obtained from a wobble signal in a form of wobbling of a track previously provided in the optical disk 151 in case of DVD+RW/+R. In case of DVD-RW/-R, instead of the wobble signal, a land pit is used for the same purpose. In case of DVD-RAM/RAM•WO, a pre-pit is used for the same purpose.

In the wobble signal in the DVD+RW/+R disk, address information called ADIP (address in pre-groove) is included, and this information is extracted by the ADIP decoder 158. Furthermore, a synchronization signal extracted by this ADIP decoder 158 is input to the DVD encoder 160, and thereby, writing to the optical disk 151 at a proper position is secured. The data in the buffer RAM 162 is processed by the DVD-ROM encoder 161 or the DVD encoder 160 so that addition of error correction code or interleave is performed, and then is written to the optical disk 151 through the laser controller 159 and optical pickup apparatus 153. The address information may be obtained from the land pit or pre-pit instead.

FIG. 23 shows a block diagram of an information processing apparatus employing the above-mentioned optical disk drive apparatus shown in FIG. 22. As shown, this apparatus includes a main control device 170, an interface 171, a recording device 172, an input device 173, a display device 174, the optical disk drive apparatus 175 shown in FIG. 22 and so forth. The main control device includes a CPU, a microcomputer, a main memory and so forth, and controls the entirety of the information processing apparatus.

The interface 171 provides a bidirectional communication interface between the optical disk drive apparatus 175 and the main control device 170, and conforms to standard interfaces of ATAPI, SCSI and so forth. The interface 171 is connected with the interface 165 in the optical disk drive apparatus shown in FIG. 22. A connection manner between the respective interfaces is not only cable connection employing a communication cable (for example, SCSI cable) but also wireless connection employing infrared ray or so.

In recording device 172 such as a hard disk drive (HDD), programs written in a code recognizable by the microcomputer of the main control device 170 are stored. Upon turning on of a power supply to the information processing apparatus, the above-mentioned programs are loaded into the main memory of the main control device 170.

The display device 174 includes a CRT, a liquid crystal device, a plasma display device or so, and displays various types of information from the main control device 170.

The input device 173 includes a keyboard, a mouse, a pointing device or so, and provides information input by the user to the main control device 170. Information from the input device 173 may be provided by air to the main control device. For example, a CRT with a touch panel or so which includes both the display device 170 and input device 173 in a unit may be applied.

The information processing apparatus has an operation system (OS) mounted therein, and all the devices/components included in the information processing apparatus are managed buy the OS.

Thus, according to the present invention in an aspect concerning the above-described sixth through ninth embodiments, it is possible to secure the light amount required for detecting the push-pull signal, and, thereby, it is possible to properly detect information such as addresses written in the pre-groove of a DVD+RW/+R, for example.

Further, the present invention is not limited to the above-described embodiments, and variations and modifications may be made without departing from the basic concept of the present invention.

The present application is based on Japanese priority applications Nos. 2003-020440, 2003-032198, 2003-032204 and 2003-040898, filed on Jan. 29, 2003, Feb. 10, 2003, Feb. 10, 2003 and Feb. 19, 2003, the entire contents of which are hereby incorporated by reference.

What is claimed is:

1. An optical pickup apparatus for applying through an objective lens a beam from a semiconductor laser to an optical disk having two recording layers, introducing reflected light from the optical disk to a focus-error-signal-detecting light receiving device and a track-error-signal-detecting light receiving device through the objective lens and a beam splitting part, and reproducing information from the optical disk, wherein:

when the beam from the semiconductor laser is focused on one of the two recording layers through the objective lens, the beam splitting part splits the beam in such a manner as to apply the reflected light from the recording layer of the two recording layers, on which the beam is focused, to the focus-error-signal-detecting light receiving device and the track-error-signal-detecting light receiving device, and also, to prevent the reflected light from the recording layer of the two recording layers, on which the beam is not focused, from being applied to at least one of the focus-error-signal-detecting light receiving device and the track-error-signal-detecting light receiving device, and the light splitting part has its area separated by a separating line which is larger than a diameter of an area to which the reflected light from the recording layer of the two recording layers on which the beam is not focused is applied to the light beam splitting part, such that the separating line is located outside of the area to which the reflected light from the recording layer of the two recording layers on which the beam is not focused is applied to the light beam splitting part.

2. The optical pickup apparatus as claimed in claim 1, wherein: the recording layer of the two recording layers, on which the beam is focused, is the recording layer which is nearer to the objective lens.

3. An optical disk drive comprising the optical pickup apparatus as claimed in claim 2.

4. An optical disk drive comprising the optical pickup apparatus as claimed in claim 1.

5. The optical pickup apparatus as claimed in claim 1, wherein: the beam splitting part comprises a hologram device.

6. An optical disk drive comprising the optical pickup apparatus as claimed in claim 5.

7. An optical disk drive comprising the optical pickup apparatus as claimed in claim 1.

* * * * *